Patented Apr. 19, 1927.

1,625,207

UNITED STATES PATENT OFFICE.

OSWALD H. HANSEN, OF PORT WASHINGTON, WISCONSIN, ASSIGNOR TO HANSEN CANNING MACHINERY CORPORATION, OF CEDARBURG, WISCONSIN, A CORPORATION OF WISCONSIN.

PROCESS OF PRESERVING FRUIT.

No Drawing. Application filed May 7, 1924. Serial No. 711,573.

This invention relates in general to improvements in the art of preserving edible substances, and relates more specifically to an improved method of treating acidic food such as certain fruits, prior to sealing the same in metallic containers, in order to eliminate subsequent perforation of the containers by chemical reactions in the packed product.

An object of the invention is to provide an improved process of treating acidic fruits such as cherries, strawberries, raspberries, loganberries, pineapple, plums and the like in order to permanently preserve the same.

It has been found in the art of preserving fruit and other food products having relatively high acid content, that after the material has been treated by the ordinary commercial processes, and is subsequently packed in sealed metallic containers such as tin cans, the acid and the air confined within the material frequently cause chemical reactions, and generate substances which attack the metal of the containers producing so-called "pin holes" or perforations in the cans, thus exposing the material to the air and permitting the product to spoil. If the air is entirely removed prior to confinement of the material, no such perforation of the containers and consequent spoilage of the product, will occur, as the presence of acid alone will not produce "pin holes".

In order to eliminate the presence of air in the material, it has heretofore been attempted to drive off the confined air by heating the material in so-called exhaust boxes, whereby the fruit was passed through a heated chamber after having been placed in the cans and before the containers were sealed. In some of these prior exhaust boxes, hot water was employed as a heating medium, but due to the limited temperatures attainable with water and the fact that uniform heating of the product could not be effected, it was practically impossible to eliminate any appreciable amount of air by this method. It has also been attempted to utilize steam as a heating agent, but the steam quickly forms a coating or crust on the exposed surface of the material and prevents the air from escaping. The use of a flame or other agency which will excessively heat the product, is also prohibitive because excessive heating of the fruit will cause it to lose its natural shape and it is extremely desirable for commercial reasons to maintain such products in their natural condition after the packing operation has been completed. Besides being ineffective air removers, the exhaust boxes of the prior art are extremely complicated and bulky occupying a great amount of space, and are also of relatively limited capacity. As most fruits are seasonable and must be quickly treated and packed when properly developed, any process of and apparatus for processing and packing which will not permit rapid treatment of large quantities of the material in an efficient manner, will not prove commercial.

It has also been attempted to ignore the presence of air and to provide metallic cans having special non-metallic internal coatings for resisting the formation of "pin holes", but the provision of the so-called enamelled cans besides being expensive, has proven an inefficient preventative for the perforating nuisance.

The present invention contemplates the provision of a simple and efficient method of rapidly treating fruit and the like for the removal of air. With the improved method, sufficient air is removed from within the substance to practically entirely eliminate danger of perforation of the cans and consequent spoilage of the material. The improved method permits rapid and efficient treatment of large quantities of the product and is capable of effective commercial exploitation with the aid of extremely simple and compact apparatus having great capacity. These and other objects and advantages of the present improvement will be apparent in the course of the following disclosure.

A clear conception of the various steps of several modifications of the improved process will be obtainable from the accompanying description and claims.

While the product treated will hereinafter be specifically designated as fruit, it will be apparent that the principles involved are generally applicable to the treatment of other acidic edible substances. The term can as used herein is intended to define any container which is capable of being perforated by chemical reactions such as herein referred to, and should not be construed to designate only tin cans such as are ordinarily employed. The term syrup as used herein is intended to cover any liquid including brine and water.

In accordance with one form of the improved process of preserving fruit, the fruit is first properly prepared for packing, by washing, pitting or otherwise treating. After such initial preparation has been effected, desirable batches of the fruit are placed in the successive cans having upper open ends. The open ends of the successive fruit laden cans are then temporarily closed after which the can interiors are connected to an air exhauster which withdraws substantially all of the confined air from within the fruit cells and the can. When a substantial vacuum has thus been established within the can and its charge, steam is admitted to the can and immediately enters the exhausted spaces. Following the admission of steam, syrup is admitted, the liquid acting to condense any remaining steam, to fill the fruit cells, and to finally submerge the fruit in liquid. The liquid positively prevents subsequent ingress of air and the temporary closure may then be removed and replaced by a permanent one. The cans thus completely filled with fruit which was preliminarily sterilized by the steam previously admitted, are ready for subsequent complete sterilization or further treatment in the usual manner.

By admitting steam or other heated inert gas to the evacuated fruit cells prior to admitting the syrup or liquid, the fruit is effectively preliminarily sterilized and preserved. Any desired method of final sterilization may obviously be employed, after the fruit cells have been properly conditioned by internal heating and are subsequently filled with the liquid. The syrup or liquid may be admitted in either cold or heated condition, and the improved method of preservation assures complete elimination of destructive gases and consequently positively prevents subsequent formation of "pin holes" in the cans. Treatment of the fruit with the improved process, in no manner affects the appearance of the fruit and the commercial exploitation of the process may be automatically effected with simple and efficient apparatus. The apparatus may be readily installed between the ordinary filler and closing machine without sacrificing as much space as is required by the exhaust boxes of the prior art.

It should be understood that it is not desired to limit the invention to the exact steps of the process herein described, for various modifications within the scope of the claims may occur to persons skilled in the art.

It is claimed and desired to secure by Letters Patent:—

1. The process of preserving fruit, which comprises, temporarily confining the fruit in a container and exhausting the air therefrom, admitting steam to the temporarily confined fruit, submerging the temporarily confined fruit in a liquid, and subsequently permanently sealing the container.

2. The process of preserving fruit, which comprises, confining the fruit and exhausting the air from the fruit cells, subjecting the confined fruit to heat, and submerging the confined fruit in liquid.

3. The process of preserving fruit, which comprises, confining the fruit and exhausting the air from the fruit cells, admitting inert gas to the evacuated cells, and submerging the fruit in a liquid.

4. The process of preserving fruit, which comprises, exhausting the air from the fruit cells, admitting heated inert gas to the evacuated cells, and subsequently submerging the fruit in a liquid.

5. The process of preserving fruit, which comprises, confining the fruit and exhausting the air from the fruit cells, preliminarily internally sterilizing the fruit by admitting heated gas to the evacuated cells, submerging the fruit in a liquid, and finally sterilizing the submerged fruit.

6. The process of preserving fruit, which comprises, temporarily confining the fruit in a container and exhausting the air from the fruit cells, admitting steam to the evacuated cells to preliminarily sterilize the fruit, submerging the fruit in a liquid, and subsequently finally sterilizing the submerged fruit and permanently sealing the container.

In testimony whereof, the signature of the inventor is affixed hereto.

OSWALD H. HANSEN.